United States Patent Office 2,824,117
Patented Feb. 18, 1958

2,824,117

PROCESS FOR THE PRODUCTION OF 1.4-DIISOCYANATOBENZENE

Alois Gemassmer, Koln-Stammheim, Germany, assignor to Farbenfabriken Bayer Aktiengesellschaft, Leverkusen, Germany, a corporation of Germany No Drawing. Application February 19, 1954
Serial No. 411,550

Claims priority, application Germany February 20, 1953

2 Claims. (Cl. 260—453)

This invention relates to an improvement in the production of 1.4-diisocyanatobenzene.

It is well known to produce organic isocyanates by reacting amines with phosgene. In the case of aromatic diamines, this reaction is usually carried out in two steps (see W. Siefken, Liebigs Annalen der Chemie, volume 562, [1949], page 96 et seq.): A so-called "cold phosgenation" which involves slowly adding a solution or suspension of the amine in an inert solvent to a solution of phosgene in an inert solvent at temperatures around 0° C., and a so-called "hot phosgenation" which involves heating the suspension of the carbamyl chloride-hydrochloride formed in the cold phosgenation to temperatures within the range of 130 and 150° C. while introducing phosgene to thereby convert the carbamyl chloride-hydrochloride into the diisocyanate with evolution of hydrogen chloride.

The reactions underlying the cold phosgenation and the hot phosgenation may be represented by the following equations:

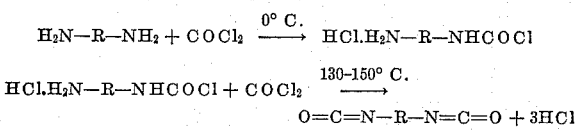

in which R stands for a divalent aromatic radical.

If p-phenylene diamine is reacted with phosgene according to this method, poor yields of 1.4-diisocyanotobenzene are obtained even after long reaction times (12 hours and more). Therefore, the above method is not suitable for large scale operation in the case of p-phenylene diamine.

It is an object of the present invention to provide an improved process for the production of 1.4-diisocyanatobenzene. Another object is to provide a process of manufacturing 1.4-diisocyanatobenzene in high yields and in a high state of purity. Further objects will appear hereinafter.

In accordance with the invention, the reaction mixture formed in the cold phosgenation, i. e., by reacting the diamine with phosgene at a temperature in the neighborhood of 0° C., as, for example, at a temperature within the range of 0–10° C. in an inert solvent, is initially contacted with additional phosgene at a temperature maintained at 80 to below 100° C., and preferably at a temperature between 80 and 90° C. for a period of time of 1 to 4 hours, and thereafter contacted with phosgene at a temperature maintained at 110 to 130° C., and preferably 115 to 125° C. for a period of time of between 1 and 4 hours.

A mode of carrying out the invention comprises adding a suspension of p-phenylene diamine in an inert solvent to a solution of phosgene in an inert solvent at a temperature of about 0° C., and treating the reaction mixture thus obtained with phosgene at first, for a period of 3 to 4 hours, at a temperature of about 80° C. and then, for a period of 1 to 2 hours, at a temperature of about 120° C.

The process in accordance with the invention may be effected in a batch-wise or continuous manner, and any suitable type of apparatus may be employed.

When the process is to be carried out intermittently, a closed vessel which is equipped with a mixer may be used. Cooling and heating of this vessel are controlled in such a manner that the required temperatures are strictly observed. When the process of the invention is to be performed continuously, the reactor may be divided into several compartments to secure a uniform residence time and to establish reaction zones having the required temperatures.

The process according to this invention makes it possible to commercially produce 1.4-diisocyanatobenzene, which is an important intermediate for the manufacture of plastic materials.

The following examples in which all parts are by weight serve to illustrate the invention without in any way limiting it.

Example 1 (prior art)

In a closed vessel equipped with a mixer 200 parts of phosgene are dissolved in 500 parts of o-dichlorobenzene. A suspension of 100 parts of p-phenylene diamine in 500 parts of o-dichlorobenzene is added to the phosgene solution which is maintained at a temperature of about 0° C. with ice and salt. After the suspension of p-phenylene diamine has been added the mixture is stirred for 1 hour. The temperature is then raised to 150 to 160° C. over a period of 2 hours while introducing phosgene and stirring, and maintained at this 150 to 160° C. for 12 hours while introducing 50 parts of phosgene per hour. After removing the phosgene by blowing with nitrogen the solution is filtered thereby separating 15 parts (when dry) of a residue. The filtrate is fractionated by the aid of a column. Thus, 82 parts of pure 1.4-diisocyanatobenzene and 40 parts of a high-boiling residue are obtained. The yield of diisocyanatobenzene corresponds to 56 percent of the theoretical.

Example 2 (process of the invention)

In a closed vessel equipped with a mixer 150 parts of phosgene are dissolved in 900 parts of o-dichlorobenzene. While cooling to thereby maintain the temperature at about 0° C. and stirring a fine suspension of 150 parts of p-phenylene diamine in 150 parts of o-dichlorobenzene is added to the phosgene solution. After the addition of the suspension is complete the temperature is raised to, and for 4 hours maintained at, 80° C. while introducing 50 parts of phosgene per hour. The temperature is then raised to, and for 2 hours maintained at, 120° C. while introducing phosgene. After removing the excess phosgene by blowing with nitrogen the reaction solution which is not very turbid is filtered whereby 2 parts (when dry) of a residue remain on the filter. From the filtrate 211 parts of 1.4-diisocyanatobenzene are obtained by fractional distillation, which corresponds to a yield of 95 percent of the theoretical. The distillation residue is 5 parts.

Example 3 (process of the invention)

In a closed vessel equipped with a mixer 150 parts of phosgene are dissolved in 1500 parts of o-dichlorobenzene. A suspension of 150 parts of p-phenylene diamine in 300 parts of o-dichlorobenzene is added at a temperature of about 0° C. While introducing 50 parts of phosgene per hour the temperature is raised to 80° C. and maintained for 3 hours within the range of 80° to 90° C. The temperature is then raised to, and for 2 hours maintained at, 120° C. while introducing phosgene. After removing the excess phosgene by blowing with nitrogen the reaction mixture is filtered whereby 4 parts (when dry) of a residue are obtained. From the filtrate 206 parts of 1.4-diisocyanatobenzene are obtained by fractionating. The residue amounts to 8 parts.

*Example 4 (process of the invention)*

In a closed vessel equipped with a mixer, 600 parts of phosgene are condensed into 2000 parts of chlorobenzene. A suspension of 300 parts of p-phenylene diamine in 1000 parts of chlorobenzene is added at +10° C. to the phosgene solution while stirring. When the addition of the suspension is complete the temperature is raised to 80° C. over a period of 1 hour and then maintained at 80° C. for 2 hours. Thereupon the temperature is raised to, and for 3 hours maintained at, 120° C. Starting from the beginning of the heating a stream of 100 parts of phosgene per hour is introduced. After removal of the excess phosgene by blowing with nitrogen the reaction mixture is filtered whereby 8 parts of a residue is obtained. The filtrate is worked up by fractional distillation which yields 400 parts of 1.4-diisocyanatobenzene and 22 parts of a distillation residue.

*Example 5 (process of the invention)*

108 parts of p-phenylene diamine are suspended in 300 parts of xylene and the suspension is added at 0° C., while cooling and stirring, to a solution of 200 parts of phosgene in 1000 parts of xylene. While introducing 50 parts of phosgene per hour the reaction mixture is heated, over a period of 50 minutes, to a temperature of 80° C. and maintained at this temperature for 2½ hours. Then the reaction mixture is heated, over a period of 30 minutes, to a temperature of 125° C. and maintained at this temperature for 3 hours. By working up the reaction mixture as described in the foregoing examples, 152 parts of pure 1.4-diisocyanatobenzene are obtained.

What I claim is:

1. Process for the production of 1.4-diisocyanatobenzene, which comprises adding a suspension of p-phenylene diamine in an inert solvent to a solution of phosgene in an inert solvent at a temperature within the range of 0 to 10° C., treating the reaction mixture thus obtained wtih phosgene at first, for a period of 1 to 4 hours, at a temperature within the range of 80 to 90° C. and then, for a period of 1 to 4 hours, at a temperature within the range of 115 to 125° C., and recovering 1.4-diisocyanatobenzene.

2. In a process for the production of 1.4-diisocyanatobenzene, in which p-phenylene diamine in an inert solvent is reacted with phosgene in a two-step process, the first step of which includes reacting said diamine with phosgene at a temperature in the neighborhood of 0° C., the improvement which comprises contacting the reaction mixture obtained from said first step with additional phosgene initially at a temperature maintained at 80 to below 100° C. for from 1–4 hours, and thereafter contacting with phosgene at a temperature maintained at 110–130° C. for from 1–4 hours.

References Cited in the file of this patent

UNITED STATES PATENTS

| | | |
|---|---|---|
| 2,625,561 | Werntz | Jan. 13, 1953 |
| 2,689,861 | Thompson | Sept. 21, 1954 |